(12) United States Patent
Guner et al.

(10) Patent No.: US 11,216,926 B2
(45) Date of Patent: Jan. 4, 2022

(54) BOREHOLE IMAGE BLENDING THROUGH MACHINE LEARNING

(71) Applicant: HALLIBURTON ENERGY SERVICES, INC., Houston, TX (US)

(72) Inventors: Baris Guner, Houston, TX (US); Ahmed Elsayed Fouda, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 96 days.

(21) Appl. No.: 16/792,692

(22) Filed: Feb. 17, 2020

(65) Prior Publication Data
US 2021/0256671 A1    Aug. 19, 2021

(51) Int. Cl.
*G06T 5/50*    (2006.01)
*G06N 3/04*    (2006.01)
*G06N 3/08*    (2006.01)

(52) U.S. Cl.
CPC .............. *G06T 5/50* (2013.01); *G06N 3/04* (2013.01); *G06N 3/08* (2013.01); *G06T 2207/20221* (2013.01)

(58) Field of Classification Search
CPC ... G06T 5/50; G06T 2207/20221; G06N 3/08; G06N 3/04
USPC .......................................................... 382/254
See application file for complete search history.

(56) References Cited

U.S. PATENT DOCUMENTS

| 9,678,239 | B2  |   | 6/2017  | Habashy et al. |
| 10,802,171 | B2 | * | 10/2020 | Meek ..................... G01V 1/282 |
| 2008/0288171 | A1 | * | 11/2008 | Itskovich ................. G01V 3/20 |
| | | | | 702/7 |

(Continued)

FOREIGN PATENT DOCUMENTS

WO    2018201114 A1    11/2018

OTHER PUBLICATIONS

Patil, "Electrical Resistivity and Permittivity Measurements of Oil Base Muds in the Frequency Range from 1 MHz to 100 MHz", Society of Petroleum Engineers; SPE-118802-PA; pp. 380-390 Publication Sep. 2010. (Year: 2010).*

(Continued)

*Primary Examiner* — Juan A Torres
(74) *Attorney, Agent, or Firm* — Polsinelli PC

(57) ABSTRACT

Aspects of the subject technology relate to systems, methods, and computer-readable media for controlling borehole imaging blending through machine learning. A blending parameter machine learning model can be trained through a supervised machine learning technique with a dataset of known input and known output associated with an electromagnetic imager tool. The blending parameter machine learning model is associated with an image blending technique for blending images generated through the electromagnetic imager tool at different frequencies. One or more blending parameters for the image blending technique can be identified by applying the blending parameter machine learning model to measurements of the electromagnetic imager tool operating to log a wellbore across a plurality of frequencies. One or more blended images can be generated by applying the image blending technique according to the one or more blending parameters to a plurality of images of the measurements made by the electromagnetic imager tool.

20 Claims, 10 Drawing Sheets

(56) References Cited

U.S. PATENT DOCUMENTS

| | | | |
|---|---|---|---|
| 2009/0306896 A1* | 12/2009 | Forgang | G01V 3/24 702/7 |
| 2010/0019772 A1* | 1/2010 | Gorek | G01V 3/24 324/355 |
| 2010/0149917 A1* | 6/2010 | Imhof | G01V 1/302 367/53 |
| 2010/0211536 A1 | 8/2010 | Al-Fattah | |
| 2011/0199089 A1* | 8/2011 | Hayman | G01V 3/24 324/347 |
| 2012/0119744 A1* | 5/2012 | Habashy | G01V 3/20 324/339 |
| 2013/0124166 A1 | 5/2013 | Clemens et al. | |
| 2013/0176030 A1* | 7/2013 | Simon | G01R 27/02 324/333 |
| 2014/0368201 A1* | 12/2014 | Leblanc | G01V 3/26 324/339 |
| 2019/0120022 A1 | 4/2019 | Zanon et al. | |
| 2019/0169962 A1 | 6/2019 | Aqrawi et al. | |
| 2019/0368316 A1 | 12/2019 | Bize-Forest et al. | |
| 2019/0383965 A1* | 12/2019 | Salman | G01V 99/005 |
| 2020/0132875 A1* | 4/2020 | Zhang | G01V 3/38 |
| 2021/0048554 A1* | 2/2021 | Guner | G01V 3/38 |
| 2021/0088686 A1* | 3/2021 | Samson | E21B 49/005 |

OTHER PUBLICATIONS

Chen, Yong-Hua et al., "Inversion-Based Workflow for a Quantitative Interpretation of the New-Generation Oil-Based Mud Resistivity Imager", SPWLA 55th Annual Logging Symposium; May 18-22, 2014.

Bloemenkamp, Richard et al., "Design and Field Testing of a New High-Definition Microresistivity Imaging Tool Engineered for Oil-Based Mud", SPWLA 55th Annual Logging Symposium; May 18-22, 2014.

Weigend, Andreas S., On Overfitting and the Effective Number of Hidden Units; CU-CS-674-93; University of Colorado, Boulder; Computer Science Technical Reports; Paper 645; Sep. 1, 1993.

International Search Report and Written Opinion for International application No. PCT/US2020/031045, dated Nov. 26, 2020, 10 pages.

* cited by examiner

BOREHOLE IMAGE BLENDING THROUGH MACHINE LEARNING

TECHNICAL FIELD

The present technology pertains to controlling borehole image blending through machine learning, and more particularly, to identifying one or more blending imaging parameters for an image blending technique through a supervised machine learning technique for controlling the image blending technique.

BACKGROUND

Electromagnetic imager tools have been developed for generating images downhole in wellbores. Specifically, electromagnetic imager tools have been developed to operate in drilling mud, or other applicable substances, to image formations surrounding a wellbore. Images of measurements obtained by electromagnetic imager tools, e.g. impedance images, exhibit several characteristics that degrade image quality. For example, when formation resistivity of a surrounding formation and an operating frequency of an electromagnetic imager tool are both relatively low, a significant mud effect can be observed. The mud effect refers to the contribution of the mud to measured impedance. Conversely, at high formation resistivities, dielectric effect causes a roll-off in the measured impedance. This roll-off in measured impedance is more pronounced at higher operating frequencies. As these image degradation effects are frequency dependent, image measurements can be made by an electromagnetic imager tool across a plurality of frequencies. In turn, the image measurements made across the frequencies can be blended together to extend the formation resistivity range where images ultimately created through the electromagnetic imager tool are an accurate representation of the formation resistivity. Additionally, real time processing techniques such as $Z\alpha$ processing for standoff correction and dielectric correction techniques can also be applied to the measurement images, e.g. measured data Image blending techniques can then be applied to combine such processed results along with the measurements to effectively extend the resistivity range capable of being measured by the electromagnetic imager tool.

Application of an image blending technique to image measurements obtained by an electromagnetic imager tool is complicated with a large number of variables that can be controlled to correctly perform the image blending technique. In particular, an image blending technique is typically applied manually by an operator requiring an operator to manually control the variables in applying the image blending technique. Specifically, the selection among a large number of data sources and adjustment of parameters for applying an image blending technique require many time consuming iterations by an experienced operator. In turn, this can introduce inconsistencies in blended image quality, particularly across different wellbores and different zones in a single wellbore. Further, this can increase the amount of time expended in applying the image blending technique to create the blending images.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
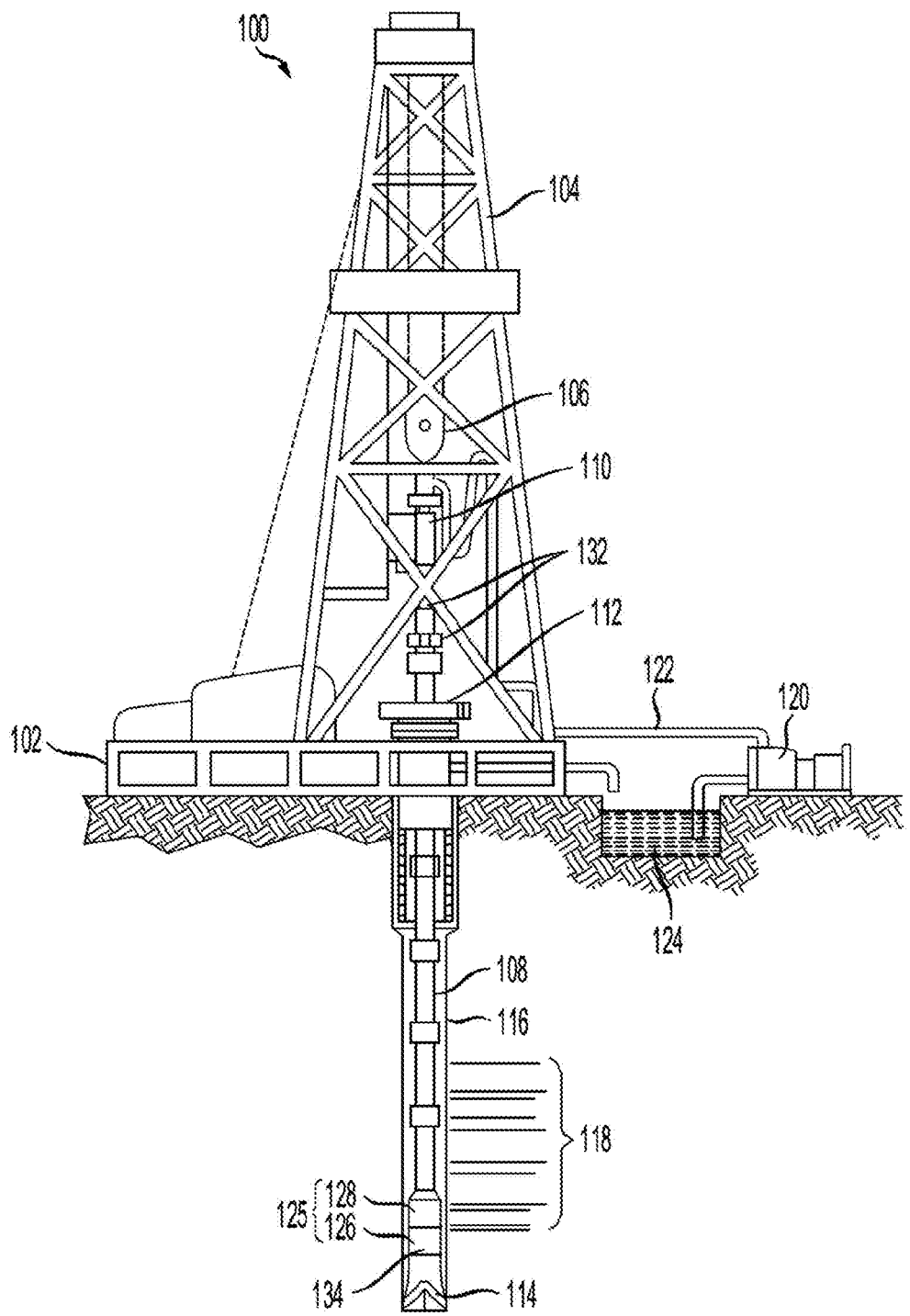
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The disclosed technology addresses the foregoing by controlling borehole image blending through machine learning. Specifically, one or more blending imaging parameters for an image blending technique can be identified through a supervised machine learning technique for controlling the image blending technique.

In various embodiments, a method can include training a blending parameter machine learning model associated with an image blending technique for blending images generated through an electromagnetic imager tool at different frequencies. The blending parameter machine learning model can be trained through a supervised machine learning technique with a dataset of known input and known output associated with the electromagnetic imager tool. The method can also include identifying one or more blending parameters for the image blending technique by applying the blending parameter machine learning model to measurements made by the electromagnetic imager tool operating to a log a wellbore across a plurality of frequencies. Further, the method can include generating one or more blended images of the wellbore by applying the image blending technique according to the one or more blending parameters to a plurality of images of the measurements made by the electromagnetic imager tool.

In various embodiments, a system can include one or more processors and at least one computer-readable storage medium storing instructions which, when executed by the one or more processors, cause the one or more processors to train a blending parameter machine learning model associated with an image blending technique for blending images generated through an electromagnetic imager tool at different frequencies. The blending parameter machine learning model can be trained through a supervised machine learning technique with a dataset of known input and known output associated with the electromagnetic imager tool. The instructions can also cause the one or more processors to identify one or more blending parameters for the image blending technique by applying the blending parameter machine learning model to measurements made by the electromagnetic imager tool operating to a log a wellbore across a plurality of frequencies. Further, the instructions can cause the one or more processors to generate one or more blended images of the wellbore by applying the image blending technique according to the one or more blending parameters to a plurality of images of the measurements made by the electromagnetic imager tool.

In various embodiments, a system can include a non-transitory computer-readable storage medium having stored therein instructions which, when executed by one or more processors, cause the one or more processors to train a blending parameter machine learning model associated with an image blending technique for blending images generated through an electromagnetic imager tool at different frequencies. The blending parameter machine learning model can be trained through a supervised machine learning technique with a dataset of known input and known output associated with the electromagnetic imager tool. The instructions can also cause the one or more processors to identify one or more blending parameters for the image blending technique by applying the blending parameter machine learning model to measurements made by the electromagnetic imager tool operating to a log a wellbore across a plurality of frequencies. Further, the instructions can cause the processors to generate one or more blended images of the wellbore by applying the image blending technique according to the one or more blending parameters to a plurality of images of the measurements made by the electromagnetic imager tool.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As both the drill bit 114 extends the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drill pipe. In other cases, the one or more of the logging tools 126 may communicate with a surface receiver 132 by wireless signal transmission, e.g., via mud pulse, electromagnetics (EM), or acoustic telemetry. In at least some cases, one or more of the logging tools 126 may receive electrical power from a wire that extends to the surface, including wires extending through a wired drill pipe.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
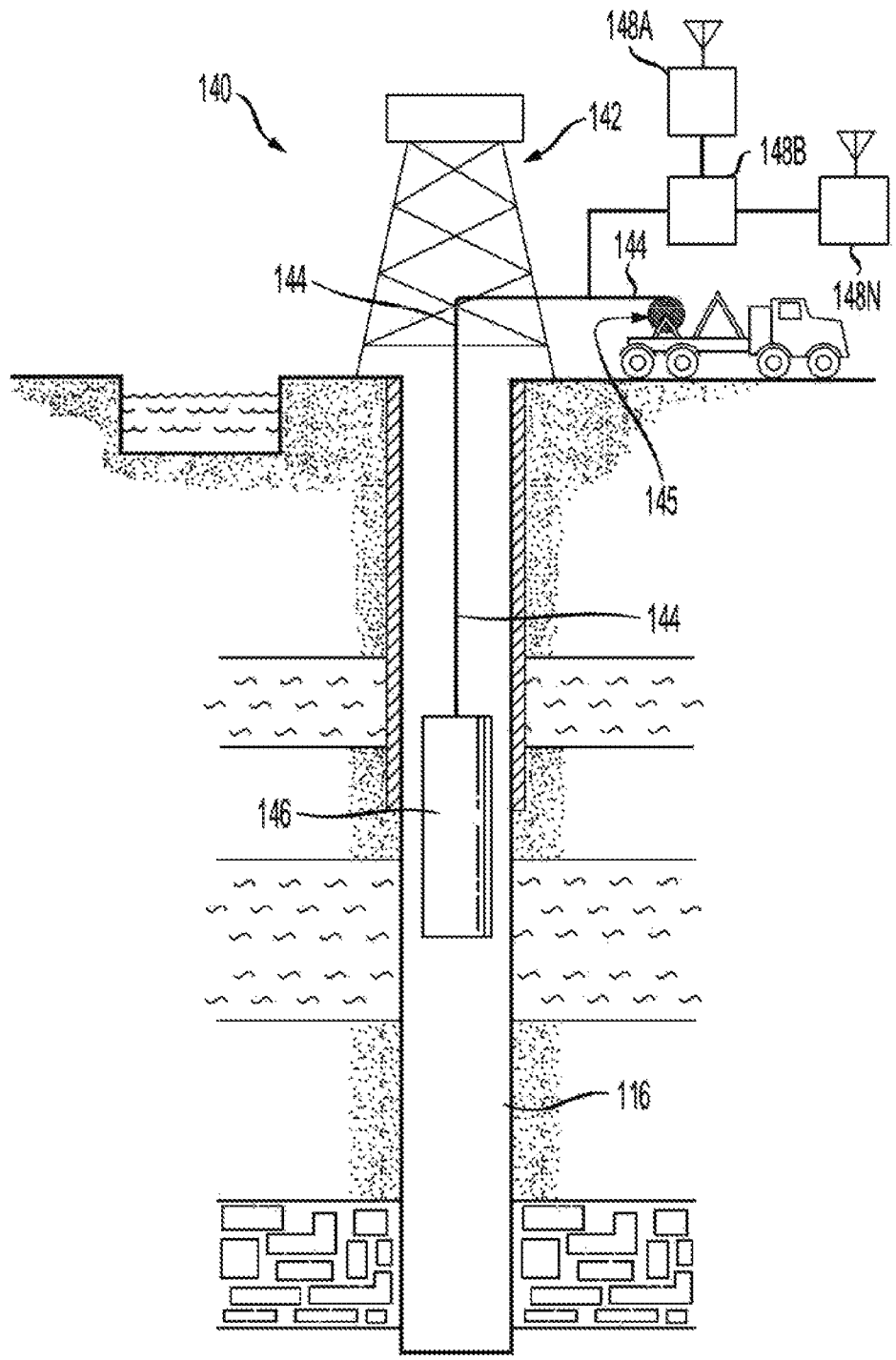
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. An electromagnetic imager tool can be operated in the example system 140 shown in FIG. 1B to log the wellbore. A downhole tool is shown having a tool body 146 in order to carry out logging and/or other operations. For example, instead of using the drill string 108 of FIG. 1A to lower tool body 146, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Figure 2A:
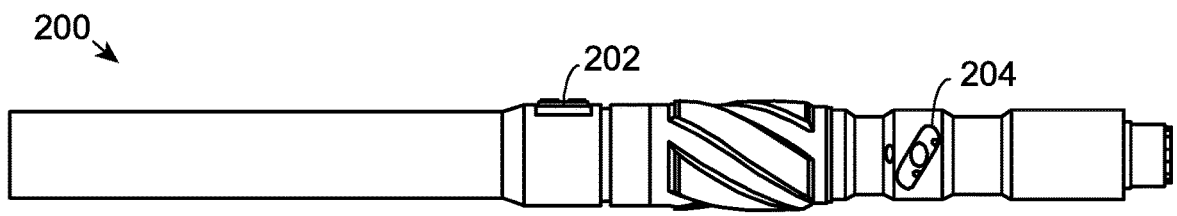
FIG. 2A illustrates a perspective view of a LWD electromagnetic imager tool.
Figure 2B:
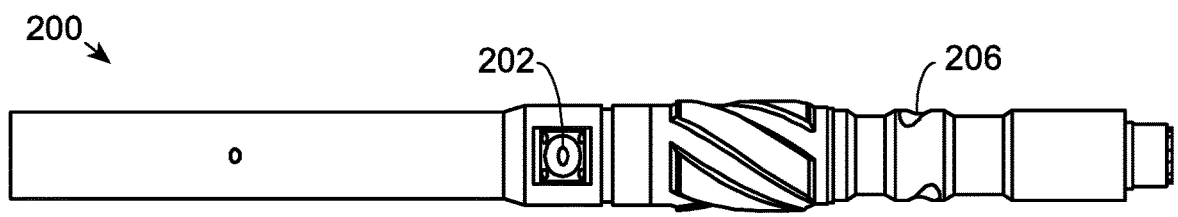
FIG. 2B illustrates another perspective view of the LWD electromagnetic imager tool.
Figure 2C:
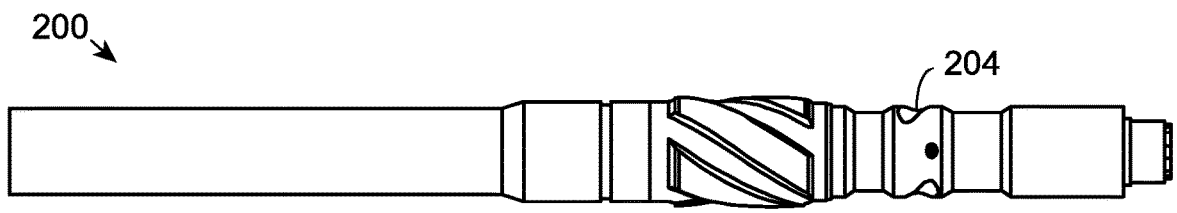
FIG. 2C illustrates yet another perspective view of the LWD electromagnetic imager tool.

FIG. 2A illustrates a perspective view of a LWD electromagnetic imager tool 200. FIG. 2B illustrates another perspective view of the LWD electromagnetic imager tool 200. FIG. 2C illustrates yet another perspective view of the LWD electromagnetic imager tool 200. The LWD electromagnetic imager tool 200/mud imager tool can be integrated as part of an applicable LWD drilling system, such as the LWD scenario 100 shown in FIG. 1A.

The LWD electromagnetic imager tool 200 includes an electromagnetic sensor 202 disposed along a collar of the LWD electromagnetic imager tool 200. The LWD electromagnetic 200 imager tool shown in FIGS. 2A-2C also includes first and second ultrasonic transducers 204 and 206, however and in various embodiments, a LWD electromagnetic imager tool 200 does not have ultrasonic transducers disposed along the collar. Specifically, the LWD electromagnetic imager tool 200 shown in FIGS. 2A-2C is merely an example of a LWD electromagnetic imager tool 200, and in various embodiments, a LWD electromagnetic imager tool 200 can have a different design. Specifically, a water-based LWD mud imager tool may have similar designs, and can provide less design and interpretation complications than oil-based LWD mud imager tools, e.g. due to the conductive nature of water-based mud.

LWD electromagnetic mud imager tools can provide a high resolution image of a borehole, e.g. when compared to other borehole imager tools. As a result, LWD electromagnetic mud imager tools can be used to identify damaged borehole sections, provide a better knowledge on the thin beds, and also provide images that can be used to determine the dip angle of formation bed.

The sensor topology of LWD electromagnetic mud imager tools operating in a LWD environment should have minimum complexity, and more importantly, it should not rely on borehole contact. With respect to the LWD electromagnetic imager tool 200 shown in FIGS. 2A-C, the electromagnetic sensor 202 can include a single measurement (also called probe, button or current) electrode mounted on the side of the collar. The electromagnetic sensor 202 can be disposed on the collar such that it is located at a certain distance (standoff) from a borehole wall during operation of the LWD electromagnetic imager tool. Further, the electromagnetic sensor 202 can include a guard electrode that surrounds, at least a portion of the button electrode. This electrode may be excited by an alternating current, sine-wave generator, and it may be coupled to the formation through a mud, e.g. an oil-based mud. This mud is non-conductive for oil-based muds. As a result, the coupling to the formation is accomplished through displacement currents in the mud. This arrangement provides a low sensitivity to standoff changes in resultant microresistivity image.

In operation of the LWD electromagnetic imager tool 200, a measurement current enters the formation, which may have a much lower resistivity than the mud. In the formation, the current flows by conduction and penetrates the formation. The current then returns back toward the borehole where it returns to the body of the LWD electromagnetic imager tool 200 surrounding the electromagnetic sensor 202, e.g. the tool body serves as the return electrode for the LWD electromagnetic imager tool 200. The tool body can remain at ground potential because of its large surface area.

Imaging through the LWD electromagnetic imager tool 200 can be achieved by dividing gathered data/measurements into azimuthal bins as the LWD electromagnetic imager tool 200 rotates in the borehole during drilling. The LWD electromagnetic imager tool can also include an additional mud resistivity sensor, e.g. a mud cell. In imaging through the LWD electromagnetic imager tool 200, real components of the measurements made by the electromagnetic sensor 202 can be used to determine formation resistivity. Further, mud resistivity measurements made by the mud resistivity sensor can be used to improve the determined formation resistivity measurements. For the purposes of this disclosure, it is assumed that mud sensor is not available or not accurate.

The LWD electromagnetic imager tool 200 can be a multi-frequency tool. Specifically, the LWD electromagnetic imager tool 200 can operate at multiple frequencies in gathering measurements. For example, a higher frequency in the MHz range may be used to overcome the nonconductive nature of oil-based muds in generating measurements while a lower frequency in the 100 kHz range may be more sensitive to standoff and thus may be used in standoff determination. Further, gathered standoff information may be used to identify features in the formation. For example, a thin band of increased resistivity can be due to an opening in the rock. In turn, this can be reflected as a jump in apparent standoff.

Figure 3:
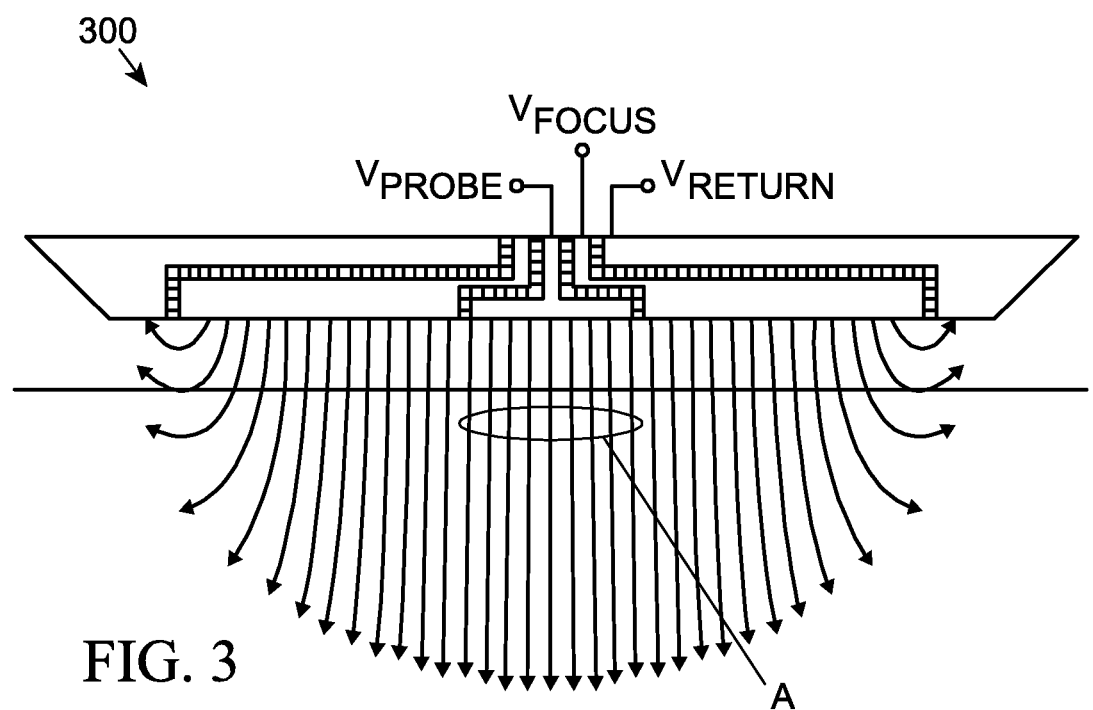
FIG. 3 shows an example current density generated by the electromagnetic sensor of the LWD electromagnetic imager tool operating to measure a formation.

FIG. 3 shows an example current density 300 generated by the electromagnetic sensor 202 of the LWD electromagnetic imager tool 200 operating to measure a formation. A power source drives a voltage between the return electrode, whose voltage with respect to the ground is represented through $V_{return}$ and the probe electrode, whose voltage with respect to a ground is represented by $V_{probe}$. Further, a circuitry is implemented to keep $V_{probe}$ equal, or roughly equal, to $V_{focus}$ for focusing of the measurement current. The current transmitted from the electromagnetic sensor is measured, for example through the use of a toroid. The ratio of the voltage difference between probe and return to the transmitted current is used to calculate a measured impedance. A basic circuit theory based model that relates the measured impedance to formation and mud parameters that is applicable to both LWD and wireline tools will be provided after a discussion on wireline electromagnetic imager tools.

Figure 4:
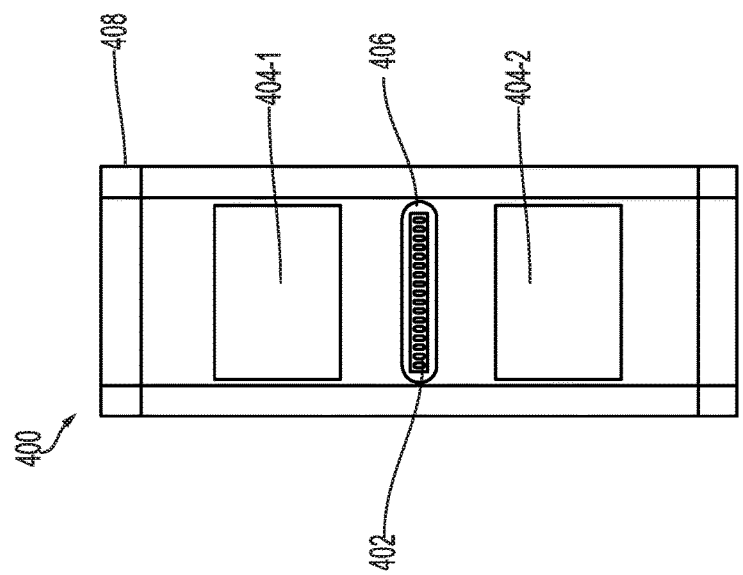
FIG. 4 illustrates a schematic diagram of an example pad of an electromagnetic imager tool, in accordance with various aspects of the subject technology.

FIG. 4 illustrates a schematic diagram of an example pad 400 of a wireline electromagnetic imager tool, as described above in FIG. 1B. Specifically, the wireless electromagnetic imager tool can be integrated with the tool body 146 of the downhole tool in FIG. 1B. More specifically, the pad 400 can be disposed on an out surface of the tool body 146 to make measurements as the downhole tool is operated within the wellbore. The electromagnetic imager tool functions to gather measurements while logging a wellbore, e.g. for purposes of imaging a formation surrounding the wellbore. Specifically, the electromagnetic imager tool can operate in a drilling mud to gather measurements for imaging the formation surrounding the wellbore. The electromagnetic imager tool can operate in an applicable type of drilling mud, such as an oil-based mud or a water-based mud, to log the wellbore. Oil-based muds have much higher resistivities than water-based muds; therefore, the mud effect is much stronger for measurements made in oil-based muds. In operating to log the wellbore, the electromagnetic imager tool can gather applicable measurements that are capable of being measured by the electromagnetic imager tool. For example, measurements made by the electromagnetic imager tool can include apparent impedivity and impedance measurements at the electromagnetic imager tool, complex impedance measurements at the electromagnetic imager tool, voltage measurements at the electromagnetic imager tool, current measurements at the electromagnetic imager tool, phase measurements at the electromagnetic imager tool, and absolute values of impedance measurements at the electromagnetic imager tool.

The measurements gathered by the electromagnetic imager tool can be used to identify values of mud and formation parameters associated with the electromagnetic imager tool, e.g. parameters inside of and outside of the wellbore. Mud and formation parameters include applicable parameters that can be identified from measurements taken by the electromagnetic imager tool for purposes of imaging, e.g. through the wellbore. For example, mud and formation parameters can include mud permittivity, mud resistivity, standoff, formation permittivity of a formation of the wellbore, and formation resistivity of the formation of the wellbore. The values of the mud and formation parameters can be identified using the techniques described herein on a per-button basis for wireline imagers. For example, formation resistivity, formation permittivity, mud resistivity, mud permittivity and standoff values can be identified for each button included as part of the button array 402 of the pad 400.

For LWD imagers, i.e., one of the logging tools 126 in FIG. 1A, measurements are generally obtained using a single button electrode. In that case, azimuthal coverage is obtained by dividing the measurements into azimuthal bins as the tool rotates. Thus, these azimuthal bins in an LWD tool serves the same purpose with the measurements made by multiple button electrodes spaced circumferentially around the tool in a wireline tool. Although the origin of the measurements are different in LWD and wireline tools, the processing methods described herein equally applies to both type of tools.

In operating the wireline electromagnetic imager tool to gather measurements for imaging, a voltage difference can be applied across the button array 402 and first and second return electrodes 404-1 and 404-2 (return electrodes 404) of the pad 400. This voltage difference can generate currents that pass from the button array 402 into the mud and a surrounding formation. The pad 400 also includes a guard electrode 406 around the button array 402. The same potential that is applied to the button array 402 can be applied to the guard electrode 406 to focus all or a substantial portion of the current emitted into the mud and the surrounding formation. Specifically, the current can be emitted substantially radially into the surrounding formation by applying the same potential on the guard electrode 406 and the button array 402. An applicable electrical and/or thermal insulating material, such as a ceramic, can fill the remaining portions of the pad 400. For example, a ceramic material can be disposed between the return electrodes 404 and the guard electrode 406. The pad 400 is covered, at least in part, with a housing 408. The housing 408, and accordingly the pad 400 through the housing 408, can be connected through a securing mechanism to a mandrel. The securing mechanism can be a movable mechanism that moves the housing 408 and the contained pad 400 to substantially maintain contact with the formation. For example, the securing mechanism can include an arm that opens and/or swivels to move the housing 408 and the contained pad 400. By moving the housing 408 and the contained pad to maintain a good contact with the formation, the mud effect can be minimized for wireline imager tools.

With reference to the mud effect and its impact on electromagnetic imager tools, the mud effect, as described previously, refers to the contribution of the mud to the measured impedance. Further and as discussed previously, this effect is particularly severe if a formation exhibits low resistivity and the distance between the button electrode's outer surface and the borehole wall, e.g. the formation, is high. In those instances, measured impedance may have very low sensitivity to the formation features. Maintaining good contact between the pad 200 and the formation can help wireline imager tools to ensure that the electromagnetic imager tool actually measures the formation and not just the mud when the formation has low resistivity.

Figure 5:
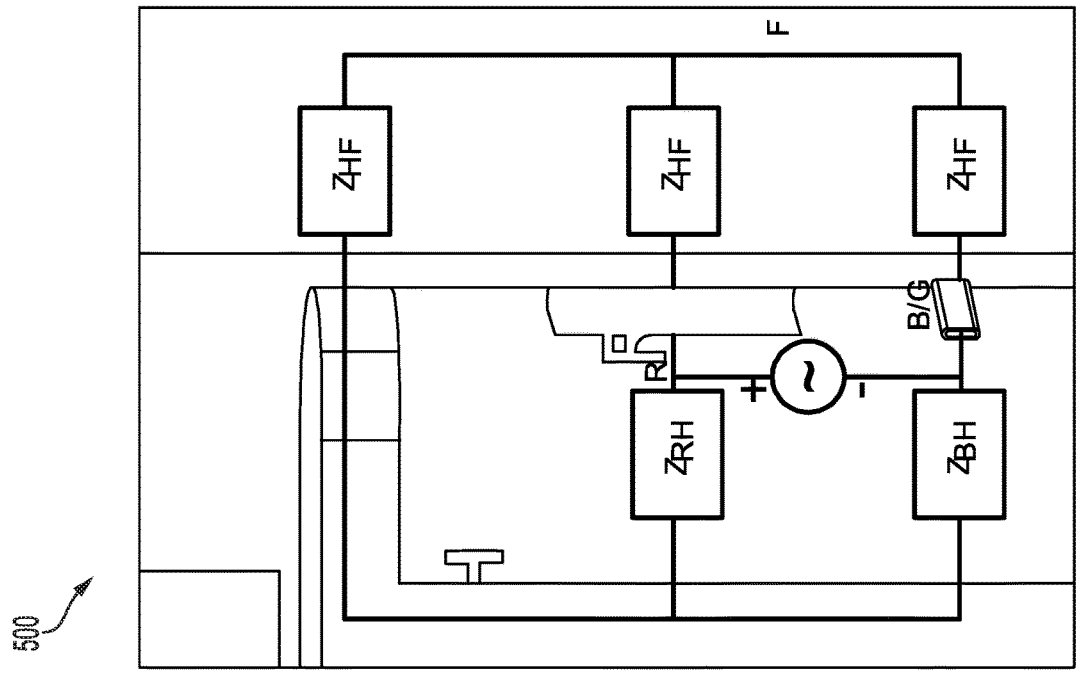
FIG. 5 illustrates a circuit model of the example pad illustrated in FIG. 4, in accordance with various aspects of the subject technology.

FIG. 5 illustrates a circuit model 500 of the example pad 400 illustrated in FIG. 4. Although the exact design of the tool is different for LWD tools, as described with respect to FIGS. 2A-3, the equations derived for the circuit model shown in FIG. 5 are applicable for LWD tools. In the model, H denotes the housing (including the mandrel), F denotes the formation, either B or G denotes the button and guard assembly, and R denotes the return signal from the formation and/or the mud. While most of the transmitted current can be returned to the return electrodes, some portions of the transmitted current can return through the housing and/or the mandrel. An impedance value for each button can be calculated by measuring the voltage between the buttons and the return electrodes and dividing the measured voltage by the current transmitted through each button of the button array. Specifically, this technique is represented in Equation 1 shown below. In Equation 1, Z is the button impedance of one of the buttons in the button array, $V_{BR}$ is the button to return voltage, and $I_B$ is the button current. With respect to the LWD tools described in FIGS. 2A-3, $V_{BR}$ can be replaced with the probe to return voltage, and $I_B$ can be replaced with the current of the probe.

$$Z = \frac{V_{BR}}{I_B} \quad \text{Equation 1}$$

A calculated button impedance, e.g. calculated by Equation 1, can be equal to the impedances of the button and guard assembly and the formation $Z_{BF}$ and the impedances of the return and the formation $Z_{RF}$, as shown in the circuit model in FIG. 5. While $Z_{BF}$ and $Z_{RF}$ are denoted with respect to the formation F, $Z_{BF}$ and $Z_{RF}$ can have contributions from both the mud and the formation. Thus, $Z_{BF}$ can equivalently be represented by Equation 2 shown below.

$$Z \approx Z_{BF} = Z_{mud} + Z_F \quad \text{Equation 2}$$

Accordingly, a measured button impedance, as shown in Equation 2, can have contributions from both the mud and the formation. If the imaginary parts of $Z_F$ and $Z_{mud}$ are mainly capacitive, and assuming this capacitance is in parallel with the resistive portion, $Z_{BF}$ can also be written as shown in Equation 3 below.

$$Z_{BF} = \frac{1}{\left(\frac{1}{R_M} + j\omega C_M\right)} + \frac{1}{\left(\frac{1}{R_F} + j\omega C_F\right)} \quad \text{Equation 3}$$

In Equation 3, R and C denote the resistance and capacitance and ω is the angular frequency (e.g. ω=2πf where f is the frequency in Hz). In Equation 3, subscript M denotes the mud while F denotes the formation. Both the mud resistance and mud capacitance can increase with standoff and decrease with the effective areas of the buttons.

Equation 3 can provide just a basic approximation to the impedance measured by the electromagnetic imager tool. However, Equation 3 can be useful in illustrating the effects of mud and formation parameters on the measured impedance. Specifically, from Equation 3, it can be deduced that high frequencies are needed to reduce the mud contribution to the measured impedance.

Figure 6:
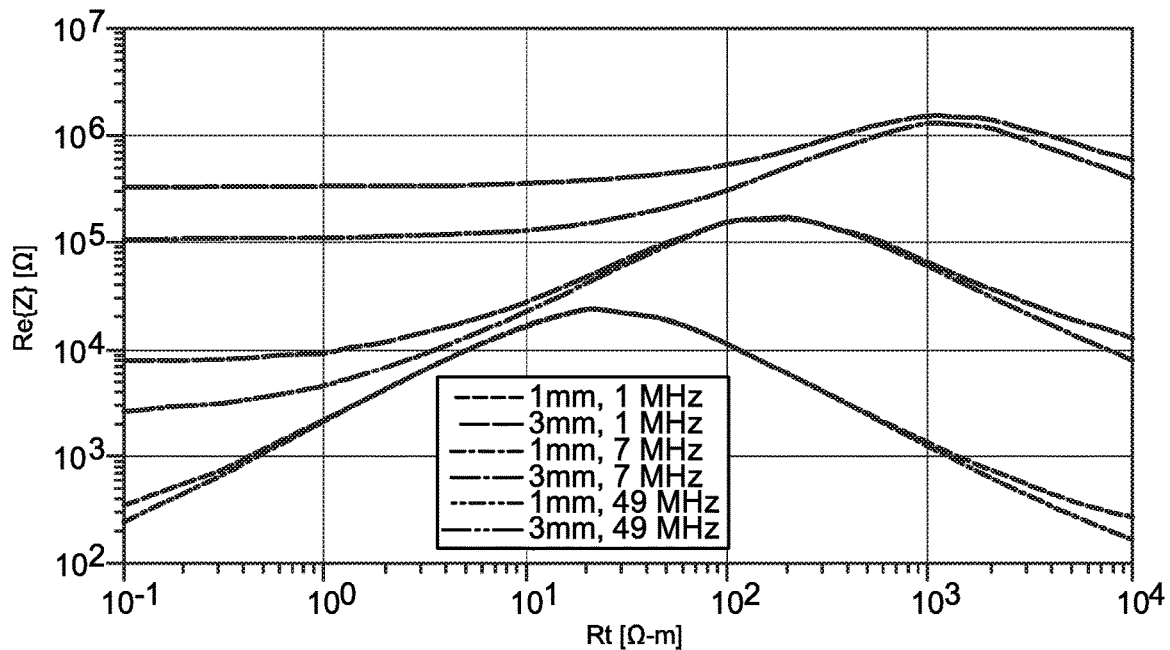
FIG. 6 is a plot of impedances measured by the electromagnetic imager tool versus formation resistivity $R_t$, in accordance with various aspects of the subject technology.

Equation 3 can also be used to obtain performance curves for the electromagnetic imager tool. These performance curves can be especially accurate in formations that have relatively homogenous characteristics throughout all or portions of the formations. FIG. 6 is a plot of real parts of the impedances measured by the electromagnetic imager tool versus formation resistivity $R_f$. In the plot shown in FIG. 6, it is assumed that formation permittivity ($\varepsilon_F$) is 15, mud permittivity ($\varepsilon_M$) is 6, and mud resistivity ($\rho_M$) is 8000 Ω-m. Results for three different frequencies (1 MHz, 7 MHz and 49 MHz) at two different standoffs (1 mm and 3 mm) are shown.

It can be seen from FIG. 6 that it is difficult to interpret measurements made by the electromagnetic imager tool. Specifically and as shown in FIG. 6, tool response does not vary linearly with formation resistivity. Instead, tool response is a complicated function of formation and mud properties, e.g. formation resistivity, formation permittivity, and standoff. Standoff, as used herein, is the distance of the button electrode's outer surface from the borehole wall. As shown in FIG. 6, the dominant effect at low formation resistivities and low frequencies is the standoff effect. In turn, small variations in standoff may cause a large difference in the impedance readings if these raw measurements are used. As follows, at high formation resistivities and high frequencies, formation permittivity starts to have the greatest contribution to the measured impedance. This can cause the apparent resistivity curve to decrease after a certain formation resistivity, e.g. the resistivity value where this effect starts to show up is formation and tool dependent, thus causing dielectric roll-off.

Figure 7:
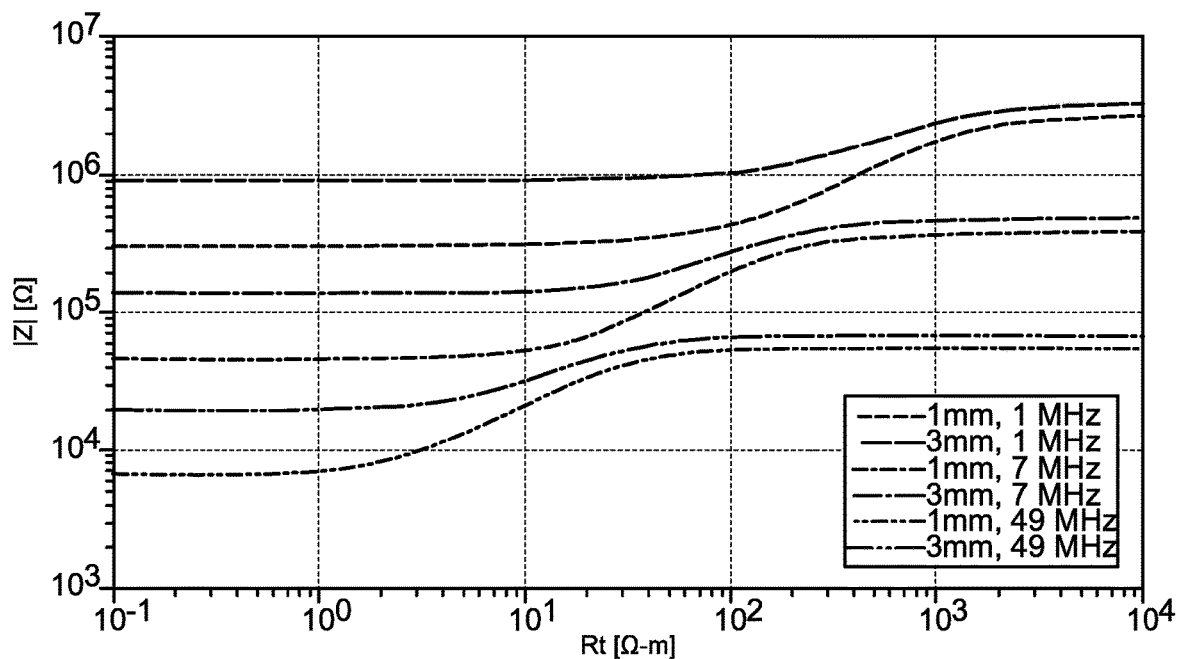
FIG. 7 is a plot of absolute values of impedances measured by the electromagnetic imager tool versus formation resistivity $R_t$, in accordance with various aspects of the subject technology.

FIG. 7 is a plot of absolute values of impedances measured by the electromagnetic imager tool versus formation resistivity $R_f$. Specifically, FIG. 7 corresponds to the plot shown in FIG. 6. As shown in FIG. 7, the absolute value of the impedance does not suffer a roll-off due to the dielectric effect at high formation resistivities. However, the sensitivity of the tool to the resistivity is greatly reduced, e.g. the absolute value is almost flat with changing formation resistivity.

The measurements of the simplified circuit approximation shown in FIG. 5 indicate that the impedances measured by the electromagnetic imager tool sometimes do no accurately reflect variations in formation resistivity. This can be attributed to numerous factors including one or a combination of formation permittivity of an imaged formation, mud resistivity associated with the electromagnetic imager tool, and mud permittivity associated with the electromagnetic imager tool.

Numerous techniques have been developed for accurately identifying, or otherwise attempting to accurately identify, formation resistivity through measurements made by an electromagnetic imager tool. Specifically, inversion-based approaches have been developed for determining formation resistivity, as well as other formation and mud properties, from measurements made by an electromagnetic imager tool. These inversion-based techniques are based on simulating the response of the tool using a forward model, such as a model obtained 3D electromagnetic simulation(s). As follows, the parameters that minimize the difference between the measurements and the model response corresponding to these parameters are returned as the inversion output. The parameters that minimize the different between the measurements and the model response can be identified through an iterative technique, such as the Gauss-Newton method.

Additionally, a supervised machine learning approach has also been developed for more accurately identifying formation resistivity and other formation and mud properties through measurements made by an electromagnetic imager tool. In the supervised machine learning approach a regression function that relates tool measurements to formation resistivity, and potentially other formation and mud properties, is identified. One of the differences between the supervised machine learning approach and the inversion-based approach is that the regression function is determined using a training dataset in the machine learning approach and whenever a new image log is obtained, it can be directly plugged in to the already determined regression function to determine specific formation and mud parameters. In the inversion-based approach, whenever a new dataset is obtained, a new cost function using only that dataset is calculated. A second difference is the cost function of the inversion-based approach involves formation and mud parameters as inputs, whereas in the supervised machine learning approach, tool measurements are the inputs to the regression function and model parameters are the outputs.

While both the inversion-based approaches and the supervised machine learning approach can aid in more accurately identifying formation and mud properties, e.g. formation resistivity, both of these techniques suffer from deficiencies. Specifically, both techniques are based on producing both a complete electromagnetic imager tool model of the electromagnetic imager tool and libraries that relate measurements to formation and mud properties using the tool models. However, generating these tool models and libraries consumes large amounts of time and computational resources.

Due to the deficiencies of the previously described techniques for identifying formation and mud properties, simpler techniques for more accurately identifying formation and mud properties from measurements made by an electromagnetic imager tool have been developed. Specifically, techniques for identifying formation resistivity, and potentially other properties, have been developed based on the fact that electromagnetic imager tools can behave more linearly with respect to the formation resistivity when an appropriate operating frequency for the actual formation resistivity is chosen. More specifically, as formation resistivity and other properties can change significantly in a wellbore, image blending techniques have been developed to blend images obtained at different operating frequencies in order to more accurately identify formation resistivities and other formation and mud properties.

As discussed previously, these image blending techniques have been developed for blending images of measurements made by an electromagnetic imager tool across frequencies. In turn, this can effectively extend the resistivity range capable of being measured by the electromagnetic imager tool. The most appropriate frequency for a measurement image pixel can be selected based on the properties, e.g. formation resistivity, of the imaged formation. As follows, the images can be blended through an image blending technique to accurately identify formation and mud properties, e.g. formation resistivity. As the properties, e.g. formation resistivity, are identified through the mere blending of actual image measurements, the image blending technique is less costly from both a time and computation perspective when compared to the previously described inversion-based approaches and supervised machine learning approaches.

The disclosure now turns to a description of an example image blending technique for identifying formation resistivity and potentially other mud and formation parameters based on measurements made by an electromagnetic imager tool. In practice, more sophisticated image blending techniques can combine data from different frequencies by applying weights that make the transition between different frequencies smoother. Furthermore, image blending techniques can use imaginary parts of the measured impedances or the absolute versions of the measured impedances in addition to or in place of the real parts of the measured impedances to blending image measurements. A tool constant can be calculated to convert the measured impedance to an apparent impedivity value based on electromagnetic modelling or an applicable calibration procedure. Real parts of the impedivity, as used herein, can refer to the measured resistivity while the imaginary parts of the impedivity, as used herein, can refer to the reactivity. These quantities can be used in producing a blending image instead of unscaled impedance measurements. Further, results of the other applicable processing techniques for correcting results at a single frequency, e.g. techniques for correcting mud effect such as $Z\alpha$ and $Z90$ and applicable techniques for performing dielectric correction, can also be utilized in an image blending technique.

For simplicity, the example image blending technique is discussed with respect to an electromagnetic imager tool operating at two frequencies. Further, in the example image blending technique, measured impedances are first converted to apparent impedivities using a calibration procedure. Calibration may be accomplished using an electromagnetic modeling of the tool response that maps the formation resistivity to measured impedance. As follows, a multiplicative coefficient in the linear operating region of the tool can be found as part of the calibration. However, such modeling may not correct for the internal gain and phase variations of the tool. A more accurate calibration can be obtained by connecting the electromagnetic imager tool to a circuit with known properties of capacitive and resistive elements or by measuring the tool performance in a test well filled with a fluid with known properties. Most commonly, a linear function that maps the known formation resistivity to the measured impedance in a least squares sense may be obtained as a result of this procedure. This linear function can then be used to obtain apparent resistivities using measurements in cases where formation properties are unknown.

After calibration, the image blending technique can be performed based on a weighted sum of real parts of measured impedance at the higher frequency when the absolute value of the higher frequency is low. The image blending technique can then switch to the lower frequency when the absolute value of the higher frequency is higher than a first threshold, Thres1. Further, the image blending technique can switch to a scaled version of the absolute value of the higher frequency when the absolute value of the higher frequency is higher than a second threshold, Thres2. The actual values of the thresholds Thres1 and Thres2 can be tool and application dependent. Scaling of the absolute value of the higher frequency can be implemented to provide a smooth transition in the value of the blended resistivity when the image blending technique switches from a resistivity curve to an impedivity curve. Term scaling can also be used in the switching from the resistivity curve to impedivity curve. Term scaling, as used herein, can include application of an applicable mapping between impedivity and resistivity such that a smooth transition is achieved between impedivity and resistivity. In practice, scaling may be accomplished by multiplying the impedivity by a constant and real coefficient. This coefficient can be denoted as cA. Since impedivity of the formation is a combination of the contribution of formation resistivity and permittivity, when ignoring mud and other higher order effects, this scaling can adjust the impedivity such that it is in the order of the formation resistivity.

In the example image blending technique, thresholds are based on the absolute value of the higher frequency for descriptive purposes. However and in practice, referencing cut-off thresholds for a specific frequency to the absolute value of that frequency can lead to better results. Specifically, Thres1 for switching between real parts of F1, the higher frequency, and real parts of F2, the lower frequency, can be based on the absolute value of F1. Further, Thres2 for switching between real parts of F2 and absolute parts of F2 can be based on the absolute value of F2.

An applicable transition function, such as the transition function shown in Equation 4, can be used instead of an abrupt cutoff function at a threshold for determining the weights.

$$\overline{R_B}(\varphi_i,z_j)=w_1(\varphi_i,z_j)\times \mathrm{Re}\{F1\}(\varphi_i,z_j)+w_2(\varphi_i,z_j)\times \mathrm{Re}\{F2\}(\varphi_i,z_j)+w_3(\varphi_i,z_j)\times cA(\varphi_i,z_j)\times \mathrm{Abs}\{F2\}(\varphi_i,z_j)$$

Equation 4

In Equation 4, $w_1$ is the weight for $\mathrm{Re}\{F1\}$, which is the apparent resistivity measured at F1. Also in Equation 4, $w_2$ is the weight for $\mathrm{Re}\{F2\}$, which is the apparent resistivity measured at F2. Further, $w_3$ is the weight for $\mathrm{Abs}\{F2\}$, which is the apparent impedivity measured at F2 and scaled by an appropriate coefficient, e.g. cA. Accordingly, the blended resistivity $\overline{R_B}(\varphi_i,z_j)$ can be calculated for the image pixel $(\varphi_i, z_j)$ according to Equation 4. $\varphi_i$ denotes the azimuthal location of the corresponding pixel, e.g. the sample number i in the azimuthal direction, and $z_j$ denotes the location of the pixel in the depth dimension, e.g. sample number j in the depth dimension.

Figure 8:
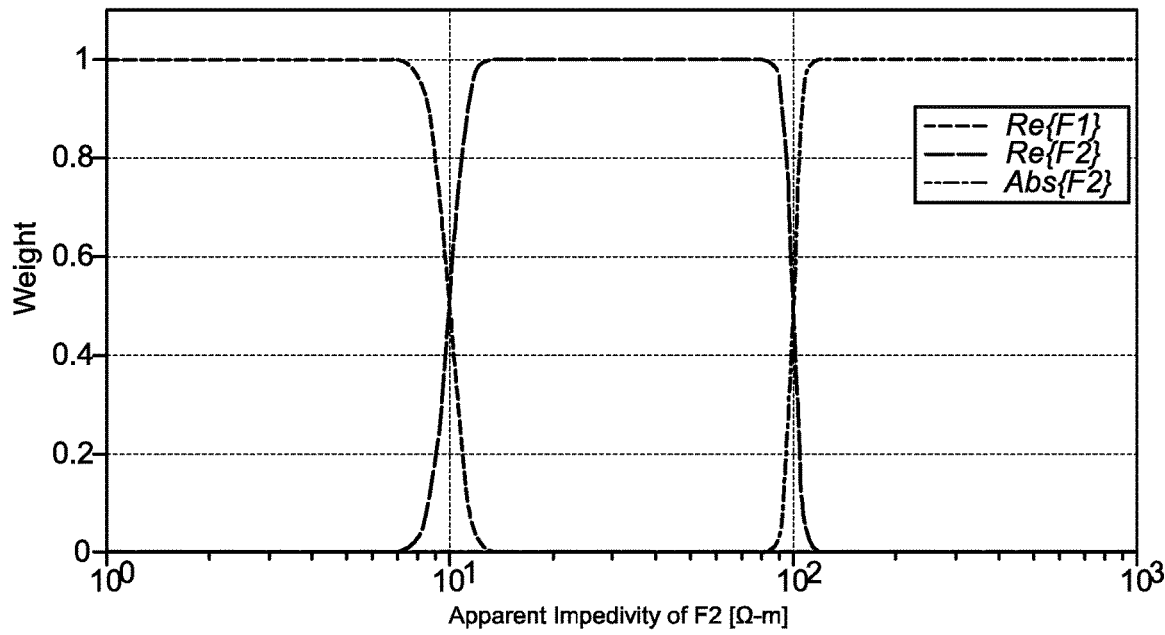
FIG. 8 is a plot of selected weights for pixels as a function of apparent impedivity for the lower frequency F2, in accordance with various aspects of the subject technology.

In application of the example image blending technique, weights at pixel $(\varphi_i, z_j)$ are chosen based on the value of $\mathrm{Abs}\{F2\}(\varphi_i, z_j)$ at that pixel. This is illustrated in FIG. 8. Specifically, FIG. 8 shows a plot of selected weights for pixels as a function of apparent impedivity for the lower frequency F2. The selected weights can satisfy Equation 5, which is shown below. Specifically, the sum of the weights for a pixel can be equal to 1.

$$w_1(\varphi_i,z_j)+w_2(\varphi_i,z_j)+w_3(\varphi_i,z_j)=1$$

Equation 5

The example image blending technique is just one example of an image blending techniques and an applicable technique for blending images of measurements made by an electromagnetic imager tool can be utilized. Specifically, in other examples, images that have been processed through an applicable type of processing, e.g. Z90 processing, Zα processing, and applicable dielectric correction techniques can be used.

Blending thresholds, image sources, and scaling coefficients, e.g. cA, can be predetermined for the image blending technique. Further, the blending thresholds, image sources, and scaling coefficients can be variable based on changing operational conditions associated with the electromagnetic imager tool. Examples of operational conditions associated with the electromagnetic imager tool include changing formation properties, inaccuracies in calibration and the resulting changes in performance between different electromagnetic imager tools, and differences in the properties of mud used between different wellbores.

Additionally, some image sources can be noisy for certain operational runs. Accordingly, an operator can manually adjust one or a combination of blending thresholds, image sources, and scaling coefficients. For example, an operator can manually select the appropriate image sources for application in the image blending technique. Specifically, an operator can utilize scatter plots of real parts of measured impedivity versus the absolute values of the impedivity, or the corresponding impedances, to manually adjust one or a combination of the blending thresholds, the image sources, and the scaling coefficients.

Figure 9:
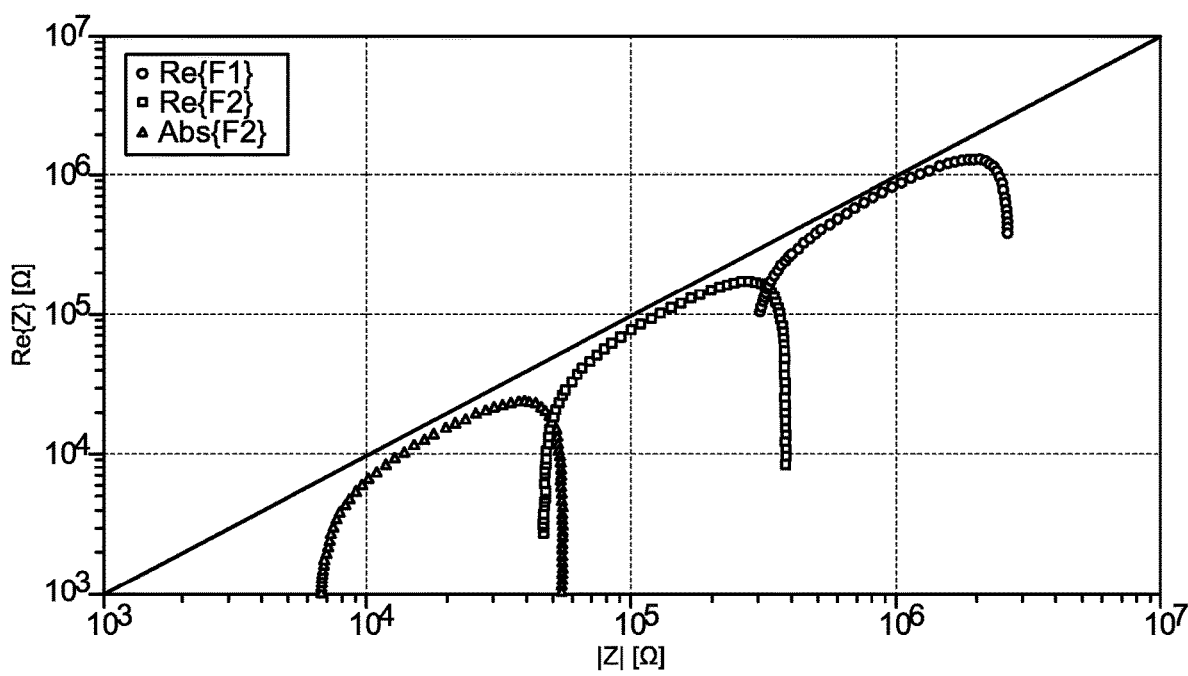
FIG. 9 is a cross-plot of the real parts of impedance verses the absolute parts of impedance of the results shown in FIGS. 6 and 7, in accordance with various aspects of the subject technology.

As an example, FIG. 9 shows a cross-plot of the real parts of impedance verses the absolute parts of impedance of the results shown in FIGS. 6 and 7. Specifically the cross-plot shown in FIG. 9 is for 1 mm stand-off. Blending thresholds for the image blending technique can be selected based on the fact that as the absolute value increases, the real part of the measurement begins to roll-off rapidly. For example and as shown in FIG. 9, roll-off begins at around 50 kΩ for 49 MHz and at around 350 kΩ for 7 MHz. These two values may be selected as Thres1 and Thres2 in a two frequency implementation. When such a plot is produced in a real wellbore, similar behaviors may be observed that allows for an adjustment of the thresholds. Similarly, the straight line on the plot shown in FIG. 9 is a line with a unitary slope. In turn, a scaling coefficient cA may be adjusted until the absolute value of the data multiplied by this coefficient lies on the straight line for the linear portion of the data. For this particular example, a cA value of approximately 0.8 would make the adjusted absolute value have the approximately same amplitude as the real part of the measurement in the linear region of the data.

As shown in the previous discussion of image blending techniques for blending image measurements for electromagnetic imaging tools, many variables, otherwise referred to as blending parameters, exist in controlling application of an image blending technique. Blending parameters, as used herein, include applicable variables that are variable across different instances of applying the image blending technique. For example, image blending parameters can include blending thresholds, the used image sources, and the scaling coefficients, which can all be adjusted for properly applying an image blending technique. As discussed previously, selectively controlling blending parameters for an image blending technique is not trivial. Noise in measurements, changes in standoff of the tool and changes in formation permittivity can create a large spread of data, which can lead to a wrong choice of the parameters, particularly if the operator does not have the required experience and understanding of an electromagnetic imager tool. Furthermore, possible variations of parameters for imaging a single wellbore can be difficult to capture and an operator might refrain from adjusting values for the parameters in imaging the entire wellbore even though varying one or more of the parameters is actually ideal for imaging the wellbore.

Figure 10:
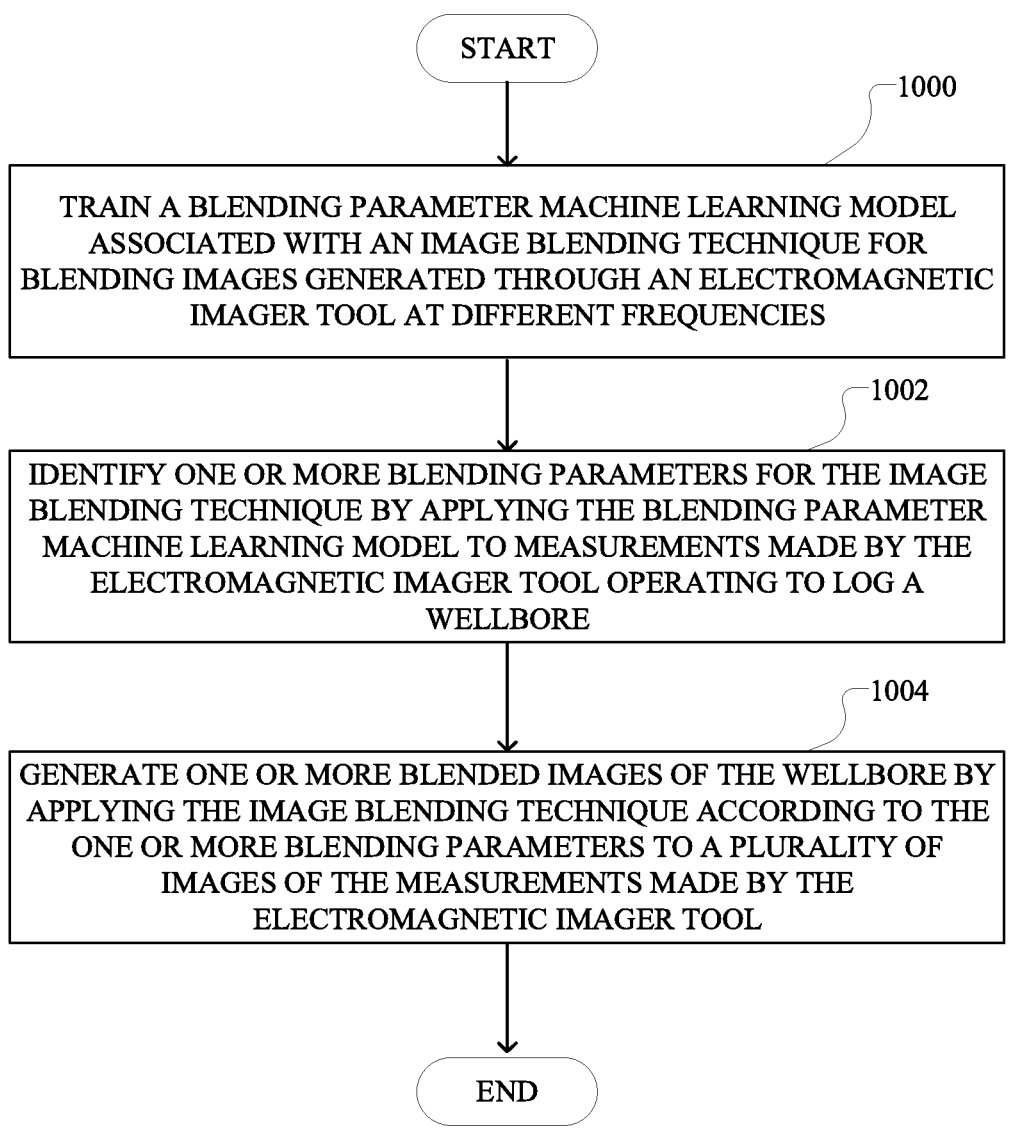
FIG. 10 illustrates a flowchart for an example method of controlling an image blending technique for an electromagnetic imager tool through a blending parameter machine learning model, in accordance with various aspects of the subject technology.

FIG. 10 illustrates a flowchart for an example method of controlling an image blending technique for an electromagnetic imager tool through a blending parameter machine learning model. The method shown in FIG. 10 is provided by way of example, as there are a variety of ways to carry out the method. Additionally, while the example method is illustrated with a particular order of steps, those of ordinary skill in the art will appreciate that FIG. 10 and the modules shown therein can be executed in any order and can include fewer or more modules than illustrated. Each module shown in FIG. 10 represents one or more steps, processes, methods or routines in the method.

The example method shown in the flowchart of FIG. 10 can be used to overcome the previously described deficiencies in controlling an image blending technique for blending image measurements made by an electromagnetic imager tool. Specifically, the flowchart shown in FIG. 10 can be used to optimize blending parameters for an image blending technique. As a result this can increase accuracy in applying the image blended technique based on the identified blending parameters, reduce processing time and human related errors, and better accommodate changing of the blending parameters in imaging a wellbore, e.g. with depth of the wellbore.

At step 1000, a blending parameter machine learning model associated with an image blending technique for blending images generated through an electromagnetic imager tool at different frequencies is trained. The image blending technique can include an applicable technique for blending images of measurements made by the electromagnetic imager tool, such as the previously described image blending technique. As will be discussed in greater detail later, the blending parameter machine learning model can be utilized in identifying one or more blending parameters for controlling application of the image blending technique. For example, the blending parameter machine learning model can be applied to identify one or a combination of blending weights, blending thresholds, and scaling coefficients for applying the image blending technique to images of measurements made by the electromagnetic imager tool.

The blending parameter machine learning model can be trained through an applicable supervised machine learning technique. In a supervised machine learning algorithm, a function, e.g. an optimal function, that relates a specific set of inputs and outputs can be found where the outputs corresponding to the specific inputs are already known. Specifically, a regression function can be found from a dataset with known inputs and outputs. More specifically, the blending parameter machine learning model can be trained with a dataset of known input and known output associated with the electromagnetic imager tool.

The dataset of known input and known output can include data related to manual application of the blending technique. Specifically, the dataset of known input and known output can include measurements made by the electromagnetic imager tool and blended images created from the measurements through manual application of the image blending technique by an operator. For example, the dataset of known input and known output can be generated by an operator manually applying the image blending technique to measurements gathered during previous operation of the electromagnetic imager tool. Further, the dataset of known input and known output can include data obtained through one or more simulations of operation of the electromagnetic imager tool. Specifically, measurements can be simulated for the electromagnetic imager tool and the simulated measurements and blending parameters used to blend images of the measurements can form the dataset of known input and known output. Additionally, the dataset of known input and known output can include both measurements of the electromagnetic imager tool as well as images obtained from these measurements through application of an applicable correction technique, e.g. a stand-off effect correction technique such as Z90 and Zα and a dielectric correction technique.

The known input of the dataset of known input and known output can include one or a combination of apparent impedivity measurements, apparent impedance measurements, stand-off corrected measurements, and dielectric corrected measurements made by and/or simulated for the electromagnetic imager tool. Specifically, the known input can include the apparent impedivities and/or impedances measured by one or more buttons of the electromagnetic imager tool. Further, the known input of the dataset of known input and known output can include one or a combination of a frequency of the measurements made by the electromagnetic imager tool, mud angles, e.g. for the application of stand-off correction techniques. Additionally, the known input of the dataset of known input and known output can include auxiliary inputs such as caliper measurements and measurements from other reference tools/supplemental tools associated with the electromagnetic imager tool. Supplemental tools can include pad-based microspherical focused laterolog tools, induction tools, and high frequency dielectric tools. Further, the known input of the dataset of known input and known output can include an indicator of noise in a specific channel associated with the electromagnetic imager tool. The indicator of noise can be a normalized, e.g. by the average value, standard deviation of a particular input channel.

Electronic and geometric variations between buttons of the electromagnetic imager tool can be ignored and the known input can correspond to measurements from an individual button of the electromagnetic imager tool. Alternatively, the known inputs can include measurements from all buttons of a pad or all buttons of all pads of the electromagnetic imager tool. Further, all button measurements within a specific depth window can serve as known input in the dataset of known input and known output. This can aid in better characterizing the blending parameters as a function of input images and the noise level of each channel without the need for a separate noise indicator.

The known output of the dataset of known input and known output can include applicable blending parameters corresponding to the known input. Specifically, the known output of the dataset of known input and known output can include one or a combination of blending weights corresponding to the known input, blending thresholds corresponding to the known input, and scaling coefficients, e.g. cA, corresponding to the known input. Further, the known output can include indications of image sources to use in applying the image blending technique to generate blended images for the electromagnetic imager tool. For example, the known output can include flags indicating to turn off certain image sources when generating blended images using the image blending technique. Accordingly, including a noise indicator as known input to known input and known output can aid in removing noisy image sources from blending, e.g. by flagging the noisy images sources as sources that should be turned off when generating blended images through the image blending technique.

Datasets of known input and known output associated with the electromagnetic imager tool can be used in not only training the blending parameter machine learning model, but also and as will be discussed in greater detail later, in validating and testing the blending parameter machine learning model. Datasets of known input and output for training, testing, and/or validating the blending parameter machine learning model can be constructed experimentally or be constructed by making measurements in a controlled environment. Specifically, the datasets of known input and output can be constructed by making measurements in a controlled environment where materials with known properties can be used to form an artificial mud and formation. Mud and formation properties can be adjusted to obtain measurements for different conditions. Since real formation resistivity is known, blending thresholds and other parameters can be adjusted to give the blending results that most closely resemble the true formation resistivity. Further, electromagnetic simulations can be used to synthetically produce measurements. For example, a commercial software such as a high frequency structure simulator (HFSS) can be utilized to synthetically produce measurements.

The supervised machine learning technique utilized in training the blending parameter machine learning model from the dataset of known input and known output can include an artificial neural network technique. The disclosure continues with an explanation of training the blending parameter machine learning model using an artificial neural network technique.

Specifically, an artificial neural network can generate a regression function that provides an optimal relationship between the known input and the known output in the dataset of known input and known output. Optimization, with reference to the optimal relationship between the known input and the known output, is based on minimizing a cost function. Specifically and similar to how biological neurons operate, it is assumed that information between inputs to outputs is passed through connections, e.g. edges, in an artificial neural network. In most neural network solutions, additional internal, e.g. hidden, nodes can be introduced to increase the number of connections and improve the accuracy of the solution. These nodes can be interconnected to inputs and outputs as well as each other. In some systems, there can be multiple layers of hidden nodes. If there are two hidden layers, as an example, connections exist between the inputs and nodes of the first hidden layer. Nodes in the first hidden layer will also be connected to nodes in the second hidden layer. Finally, nodes in the second hidden layer will be connected to output nodes. Accordingly, input and outputs are not connected directly to each other but through the nodes of the hidden layers.

Figure 11:
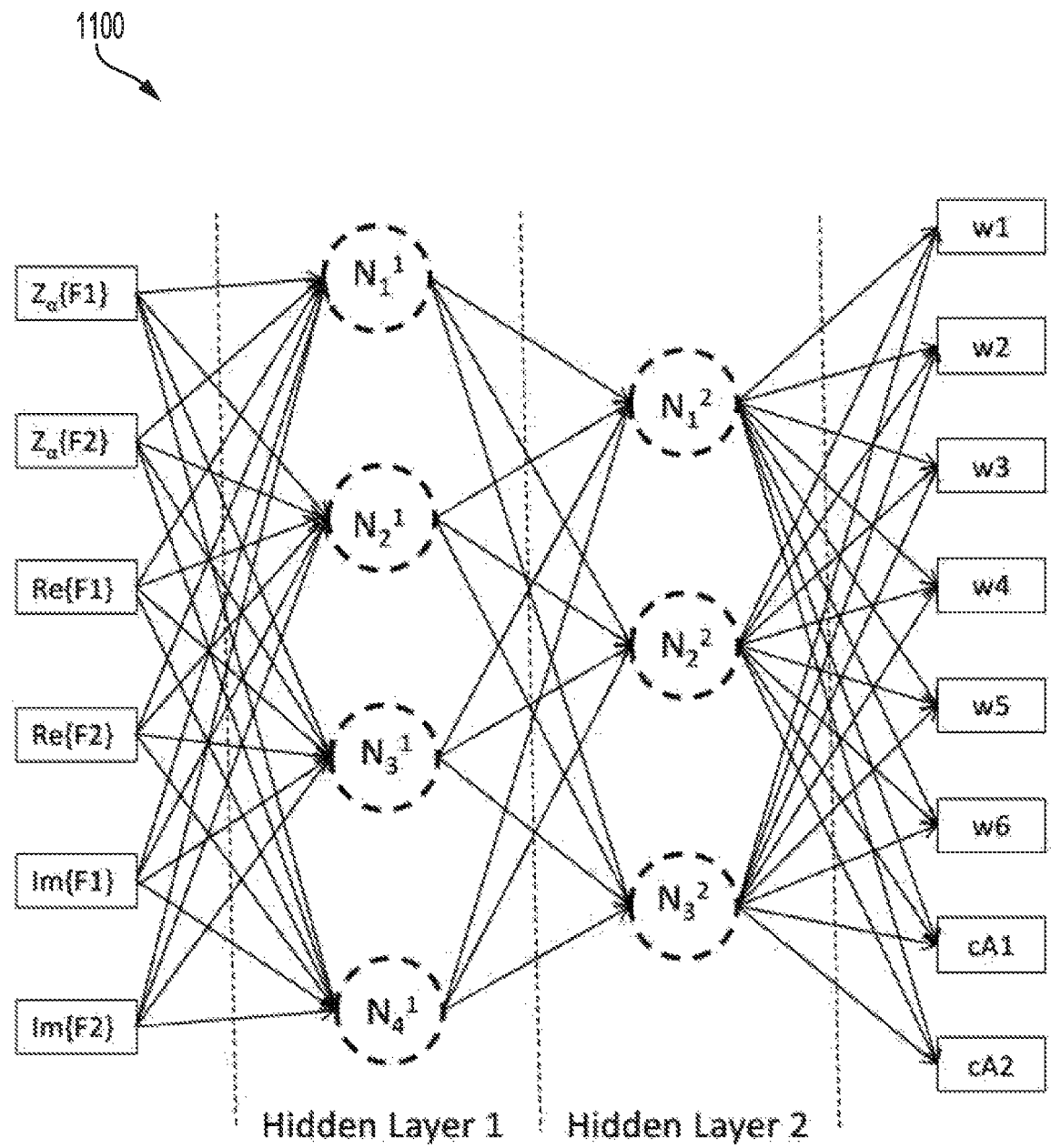
FIG. 11 is an example artificial neural network for training a blending parameter machine learning model to identify blending parameters for an image blending technique, in accordance with various aspects of the subject technology.

FIG. 11 is an example artificial neural network 1100 for training a blending parameter machine learning model to identify blending parameters for an image blending technique. In the example neural network 1100, inputs are real and imaginary parts of the impedivity measured by buttons in electromagnetic imager tool for each of the operating frequencies of the tool. Further, in the example neural network 1100, intrinsic differences between buttons of the electromagnetic imager tool are not considered and it is assumed that the tool operates at two distinct frequencies, F1 and F2. The image sources for blending are $Z_\alpha\{F1\}$, $Z_\alpha\{F2\}$, $Re\{F1\}$, $Re\{F2\}$, $Im\{F1\}$ and $Im\{F2\}$ for a single image pixel, e.g. measurement sample. Im is the imaginary component of the measurement at the corresponding two distinct frequencies. The outputs in this example are w1, w2, w3, w4, w5, w6, cA1 and cA2, where w1 is the weight of the $Z_\alpha\{F1\}$ computed for the pixel, w2 is the weight of the $Z_\alpha\{F2\}$ computed for the pixel, w3 is the weight of the $Re\{F1\}$ measurement for the pixel, w4 is the weight of the $Re\{F2\}$ measurement for the pixel, w5 is the weight of the $Abs\{F1\}$ measurement for the pixel calculated by Equation 6, w6 is the weight of the $Abs\{F2\}$ measurement for the pixel calculated by Equation 7, cA1 is the scaling coefficient for $Abs\{F1\}$, and cA2 is the scaling coefficient for $Abs\{F2\}$. Some of the image sources excluded from blending if their corresponding weight is zero.

$$Abs\{F1\} = \sqrt{Re[F1]^2 + Im[F1]^2} \qquad \text{Equation 6}$$

$$Abs\{F2\} = \sqrt{Re[F2]^2 + Im[F2]^2} \qquad \text{Equation 7}$$

In the example neural network 1100 shown in FIG. 11, there are two hidden layers. The first hidden layer has four nodes while the second hidden layer has three nodes. Each connection between nodes, inputs, and outputs can have a specific weight. These weights define the value of the node in terms of the values of other nodes, inputs, and outputs with outgoing connections to that node. For example, node $N_1^1$ has incoming connections from all the input nodes. Thus, the value of node $N_1^1$ can be expressed as shown in Equation 8.

$$N_1^1 = f(\theta_{10}^1 + \theta_{11}^1 \times Z_\alpha\{F1\} + \theta_{12}^1 \times Z_\alpha\{F2\} + \theta_{13}^1 \times Re\{F1\} + \theta_{14}^1 \times Re\{F2\} + \theta_{15}^1 \times Im\{F1\} + \theta_{16}^1 \times Im\{F2\}) \qquad \text{Equation 8}$$

In Equation 8, $\theta_{11}^1$ is the weight between the connection of node $N_1^1$ and input $Z_\alpha\{F1\}$ and so on. For this example, the weights are different from the blending weights that are included in the outputs. $\theta_{ij}^k$ can denote the weight of the connection between node $N_i^k$ and node $N_j^{k-1}$, where input nodes can be to be $N_1^0 = Z_\alpha\{F1\}$ and so on while outputs nodes can be $N_1^3 = w1$ and so on. f denotes a specific function. For example, f can be the sigmoid function given by Equation 9.

$$\sigma(x) = \frac{1}{1 + e^{-x}} \qquad \text{Equation 9}$$

Although not depicted in FIG. 11, an additional bias node can be added to each layer other than the output layer to provide a DC offset to the values. Bias nodes do not have incoming connections and they only provide outgoing connections to the subsequent layer. By convention, bias nodes have a value of 1. $\theta_{10}^1$ in Equation 8 denotes the weight of the connection between this bias term and the node $N_1^1$.

The dataset of known input and output for training the neural network 1100 shown in FIG. 11 can include any of the previously described data with respect to datasets of known input and known output. In particular, only the known input and corresponding known output having high quality, e.g. such as based on an expert opinion, correlation of the outputs to results of other reference tools, or correlation to results obtained from an inversion, can be used in training the neural network 1100. A large portion of these samples, e.g. known input and corresponding known output, can be used in training the neural network 1100, such as 80% of the samples, while the rest can be used in validation and testing as will be described in greater detail later. The parameter set for each sample of the dataset of known input and known outputs can be denoted as $\overline{Y}_i^T$ where i changes from 1 to N, and where N is the number of samples in the dataset. Accordingly, the cost function of the neural network 1100 can be described by Equation 10.

$$\arg_{\overline{w}} \min \Sigma_{i=1}^N \|\overline{Y}_i^T - \overline{Y}^N(\overline{T}^i, \overline{\theta})\| \qquad \text{Equation 10}$$

In Equation 10, $\overline{Y}^N(\overline{T}^i, \overline{\theta})$ represents the output of the neural network 1100 for the $i^{th}$ training set with training measurements of $\overline{T}^i$ and $\overline{\theta}$ is the weight of the connections of the neural network 1100 over which the cost function is minimized. Cost functions can be the mean square error between the prediction of the neural network 1100 and a dataset of known input and known output used in training the neural network 1100. Additionally, other forms of error definitions can be used and additional regularization terms to the cost functions can be added as well.

After the neural network 1100 is trained using the dataset of known input and known output, another dataset of known input and known output that is not used in training the neural network 1100, otherwise referred to as a validation dataset, can be used in validating the neural network 1100. The validation dataset can include a subset of a dataset of known input and known output that is not used in training the neural network 1100. Using the validation dataset to validate the trained neural network 1100 can prevent overfitting, e.g. that the neural network 1100 is perfectly optimized for the training dataset but has deficiencies in predicting data outside of the training dataset.

For validation, the value of a cost function, such as the function shown in Equation 10, can be computed based on the validation dataset. If the error is high, parameters of the neural network 1100 can be updated in order to improve the results. Finally, the results can be tested on yet another, independent dataset called the testing dataset to classify the final error. The primary purpose of the testing dataset is cross-validation. In cross-validation, datasets are divided into random training, validation and testing parts and the network that has the minimal testing error can be selected at the end.

While the neural network 1100 shown in FIG. 11 depicts identifying all blending parameters using a single neural network, alternatively, a plurality of neural networks and corresponding regression functions can be trained for generating specific blending parameters. Specifically, output blending parameters can be segmented into groups, and corresponding known inputs suitable for each of the groups can be identified. Subsequently, separate neural networks can be generated for each group. For example, two separate neural networks can be created for highly resistive layers and less resistive layers. Further in the example, a neural network for the highly resistive layers may not use $Z\alpha$ as an image source as an example, while the neural network for the less resistive case may not use the absolute values as an image source. In turn, when the neural networks are actually applied, switching between the two neural networks can be achieved through a decision tree approach, e.g. where the decision is made based on the absolute value of the measurements.

In another example, a recurrent solution can be applied such that an estimate for a given depth point or a given button are used as inputs to the neural network for estimating the blending parameters of an adjacent depth point or a button. Such a solution can aid in regularizing the outputs and preventing large changes.

While reference has been made throughout this disclosure to using artificial neural networks for generating the blending parameter machine learning model, other applicable types of supervised machine learning techniques can be used in training or otherwise generating the blending parameter machine learning model.

Specifically, an evolutionary technique can be used in training the blending parameter machine learning model. In evolutionary techniques, a large number of candidate regression functions are tested. These candidate functions can include polynomial, exponential, logarithmic and trigonometric expressions among others. Conditional statements and step functions can be tested as well. Initial candidate solutions are seeded randomly within the search space. At each iteration of the evolutionary technique, which is called a generation in analogy with biology, properties of the candidate functions such as the coefficients of the functions or combinations of individual terms that make up the functions are mutated or crossed over. Mutation means a randomly created variation of a property while crossing over means replacing a property of a function with another or combining two or more functions while keeping some or all of the terms of each function. A subgroup of the candidate functions are selected based on a cost function at the end of an iteration. A value of the cost function determines the fitness of the function, again in analogy with the biological phenomenon. A final regression function can then be selected when a predetermined fitness threshold is satisfied or a maximum number of iterations or function evaluations have been performed.

Further, a random forest regression technique can be used in training the blending parameter machine learning model. In the random forest approach, regression models are created using a random subset of one or a combination of the training, validation and testing datasets based on a decision tree approach. Then, these regression functions are combined by averaging them to create a final regression function for the dataset. Decision trees have nodes for each one of the input variables. The branches of the tree represent the possibility of an outcome while the leaves of the tree denote possible outputs. The lay out of the nodes is based on how well each node can classify the target output.

Additionally, a support vector machine technique can be used in training the blending parameter machine learning model. The support vector regression technique is a subclass of the support vector machine technique that is used to find a regression function. It is based on minimizing a weight function whose inner product with the input and a DC offset is an approximation of the output Returning back to the method of the flowchart shown in FIG. 10, at step 1002, one or more blending parameters for the image blending technique are identified by applying the blending parameter machine learning model to measurements made by the electromagnetic imager tool operating to log a wellbore. Specifically, the wellbore can be logged using the electromagnetic imager tool and the measurements obtained by the electromagnetic imager tool in logging the wellbore can be applied to the blending parameter machine learning model to identify one or more blending parameters for the image blending technique.

The measurements obtained by the electromagnetic imager tool that are applied to the blending parameter machine learning model can include applicable measurements capable of being measured by the electromagnetic imager tool or derived from measurements made by the electromagnetic imager tool. Specifically, the measurements applied to the blending parameter machine learning model can include the same type of known input of one or more datasets of known input and known output used in training, validating, and/or testing the blending parameter machine learning model. For example, measurements applied to the blending parameter machine learning model can include one or a combination of apparent impedivity measurements, apparent impedance measurements, stand-off corrected measurements, and dielectric corrected measurements. The blending parameters identified through application of the blending parameter machine learning model to the measurements can include the same type of known output of one or more datasets of known input and known output used in training, validating, and/or testing the blending parameter machine learning model. For example, the blending parameters identified through application of the blending parameter machine learning model to the measurements can include one or a combination of blending weights, blending thresholds, and scaling coefficients.

In applying the measurements to the blending parameter machine learning model to identify one or more blending parameters for the image blending technique, the measurements can be substituted into one or more regression functions of the blending parameter machine learning model. With reference to one or more neural networks forming the blending parameter machine learning model, since every image pixel will have its own weight and coefficients, a matrix that has the same number of elements as the image pixels can be obtained for each parameter. However, in alternate embodiments blending thresholds and scaling coefficients can be calculated over a depth window and these same coefficients can be used for all the pixels within the window. Accordingly, the total number of blending parameters can be less than the size of the image pixels.

The measurements applied to the blending parameter machine learning model can be preconditioned before being applied to the blending parameter machine learning model. This can improve the accuracy in identifying the one or more blending parameters using the blending parameter machine learning model. Preconditioning can include calibrating the measurements, e.g. to ensure that the measurements are consistent with the dataset of known input and known output used in training the blending parameter machine learning model. Calibration can be temperature dependent to correct for electronic offsets introduced by the changing downhole temperature downhole. Downhole temperature can be logged by a temperature sensor disposed downhole in the wellbore. Furthermore, additional processing can be applied to the measurements to reduce noise, e.g. as part of preconditioning the measurements. For example, the measurements can be filtered to reduce noise and eliminate outlier measurements or otherwise anomalies.

As described previously, the blending parameter machine learning model can be configured to jointly identify a plurality of different types of blending parameters. For example, the blending parameter machine learning model can be a single neural network configured to jointly identify the plurality of different types of blending parameters. Further, and as described previously, the blending parameter machine learning model can include portions that are each configured to identify specific subsets of a total number of types of different blending parameters. Specifically, the blending parameter machine learning model can include a plurality of regression functions configured to identify different subsets of blending parameters of a plurality of blending parameters. In an extension of this embodiment, also previously described, multiple regression functions may be created for a subset of the blending parameters. In turn, application of the different regression functions can be selectively switched through a decision tree to identify the corresponding blending parameters.

At step 1004, one or more blended images of the wellbore are generated by applying the image blending technique accord to the one or more blending parameters to a plurality of images of the measurements made by the electromagnetic imager tool. Specifically, the one or more blended images of the wellbore can be generated by applying the image blending technique according to the one or more blending parameters to a plurality of images of the measurements made by the electromagnetic imager tool across a plurality of frequencies. For example, identified blending weights and scaling coefficients can be identified for each image pixel and one or more corresponding blended images can be generated using these weights and the corresponding values of the input images at each image pixel.

The one or more blending parameters identified at step 1002 can be constrained before they are applied in generating the one or more blended images at step 1004. Specifically, the blending parameters can be constrained for the physicality of the results. For example, scaling coefficients should be a smooth function of the depth as well as the absolute value of the measurements. The blending parameters can also be filtered before application at step 1004 to reduce the noise in the blended results. Furthermore, the weights can be normalized to make the sum of the weights equal to 1.

Additionally, further constraints can be applied to the one or more resultant blended images generated at step 1004. For example, formation resistivity can be constrained between a predicted lower range of operation for the imager tool such as 0.01 $\Omega$-m to an upper range such as 100000 $\Omega$-m. Methods such as the application of histogram equalization and a smoothing filter can also be used to improve the quality of the one or more blended images.

Figure 12:
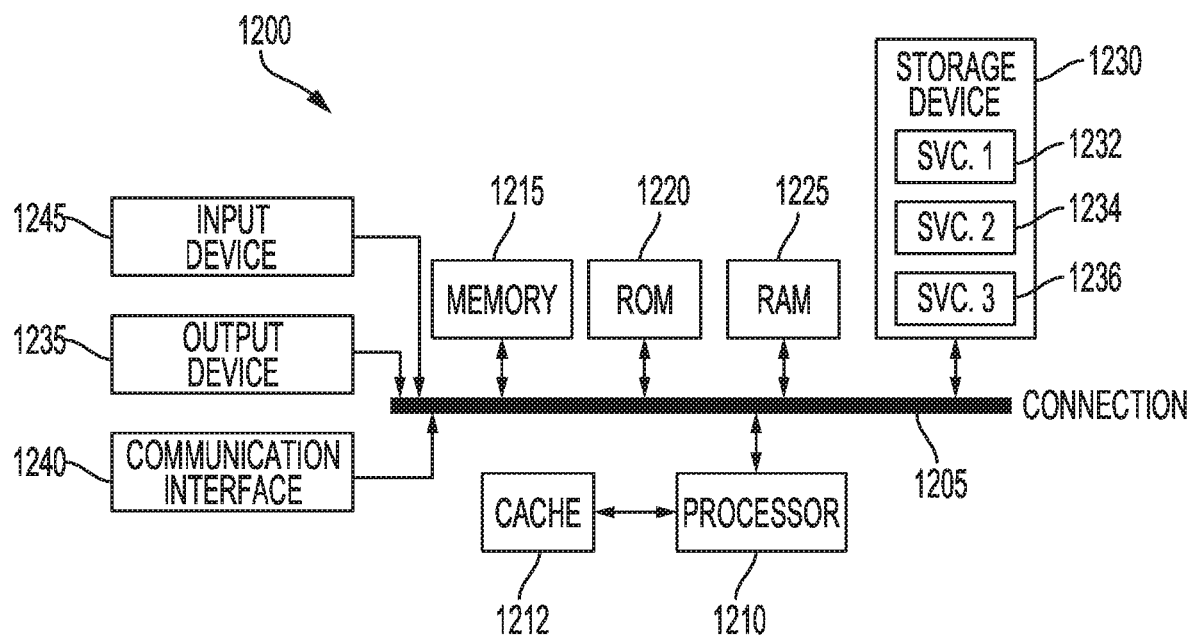
FIG. 12 illustrates an example computing device architecture which can be employed to perform various steps, methods, and techniques disclosed herein.

FIG. 12 illustrates an example computing device architecture 1200 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 12 illustrates an example computing device architecture 1200 of a computing device which can implement the various technologies and techniques described herein. Specifically, the computing device architecture can be integrated with the electromagnetic imager tools described herein, Further, the computing device can be configured to implement the techniques of controlling borehole image blending through machine learning described herein. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

A method comprising training, through a supervised machine learning technique with a dataset of known input and known output associated with an electromagnetic imager tool, a blending parameter machine learning model associated with an image blending technique for blending images generated through the electromagnetic imager tool at different frequencies. The method can also include identifying one or more blending parameters for the image blending technique by applying the blending parameter machine learning model to measurements made by the electromagnetic imager tool operating to log a wellbore across a plurality of frequencies. Further, the method can include generating one or more blended images of the wellbore by applying the image blending technique according to the one or more blending parameters to a plurality of images of the measurements made by the electromagnetic imager tool. The method can also include disposing the electromagnetic imager tool in the wellbore and operating the electromagnetic imager tool to gather the measurements by logging the wellbore across the plurality of frequencies. Further, the method can include applying the measurements gathered by the electromagnetic imager tool as input to the blending parameter machine learning model to identify the one or more blending parameters.

A system comprising one or more processors and at least one computer-readable storage medium having stored therein instructions which cause the one or more processors to train, through a supervised machine learning technique with a dataset of known input and known output associated with an electromagnetic imager tool, a blending parameter machine learning model associated with an image blending technique for blending images generated through the electromagnetic imager tool at different frequencies. The instructions can also cause the one or more processors to identify one or more blending parameters for the image blending technique by applying the blending parameter machine learning model to measurements made by the electromagnetic imager tool operating to log a wellbore across a plurality of frequencies. Further, the instructions can cause the one or more processors to generate one or more blended images of the wellbore by applying the image blending technique according to the one or more blending parameters to a plurality of images of the measurements made by the electromagnetic imager tool. The system can also include the electromagnetic imager tool configured to gather the measurements by logging the wellbore across the plurality of frequencies when the electromagnetic imager tool is disposed in the wellbore.

A non-transitory computer-readable storage medium having stored therein instructions which, when executed by the one or more processors, cause the one or more processors to train, through a supervised machine learning technique with a dataset of known input and known output associated with an electromagnetic imager tool, a blending parameter machine learning model associated with an image blending technique for blending images generated through the electromagnetic imager tool at different frequencies. The instructions can also cause the one or more processors to identify one or more blending parameters for the image blending technique by applying the blending parameter machine learning model to measurements made by the electromagnetic imager tool operating to log a wellbore across a plurality of frequencies. Further, the instructions can cause the one or more processors to generate one or more blended images of the wellbore by applying the image blending technique according to the one or more blending parameters to a plurality of images of the measurements made by the electromagnetic imager tool.

The dataset of known input and known output can include data related to manual application of the image blending technique to images of previous measurements gathered by the electromagnetic imager tool during previous operation of the electromagnetic imager tool. Further, the dataset of known input and known output can include data obtained through one or more simulations of operation of the electromagnetic imager tool. The known input in the dataset of known input and known output can include one or a combination of apparent impedivity measurements, apparent impedance measurements, stand-off corrected measurements, and dielectric corrected measurements. Further, the known input in the dataset of known input and known output can include one or a combination of frequency measurements, caliper measurements, formation resistivity measurements gathered by supplemental tools to the electromagnetic imager tool, and noise level measurements. The supervised machine learning technique can be an artificial neural network technique, an evolutionary technique, a random forest regression technique, or a support vector machine technique.

The known output in the dataset of known input and known output can also include one or a combination of blending weights corresponding to the known input, blending thresholds corresponding to the known input, and scaling coefficients corresponding to the known input.

A plurality of different types of blending parameters can be identified by applying the blending parameter machine learning model to the measurements made by the electromagnetic imager tool. Further, the blending parameter machine learning model can be configured to jointly identify all of the plurality of different types of blending parameters together based on the measurements made by the electromagnetic imager tool. Additionally, the blending parameter machine learning model can include a plurality of regression functions and each regression functions produces a corresponding subset of a plurality of different types of blending parameters the method further comprising identifying the plurality of different types of blending parameters by applying the plurality of regression functions to the measurements made by the electromagnetic imager tool. Application of the plurality of regression functions to the measurements can be switched through a decision tree to identify the plurality of different types of blending parameters. Further, the measurements made by the electromagnetic imager tool operating to log the wellbore can be calibrated to generate calibrated measurements. In turn, the one or more blending parameters for the image blending technique can be identified by applying the blending parameter machine learning model to the calibrated measurements. Additionally, the measurements made by the electromagnetic imager tool can be filtered before identifying the one or more blending parameters for the image blending technique. Alternatively, the one or more blending parameters can be filtered after identifying the one or more blending parameters for the image blending technique to generate one or more filtered blending parameters. In turn, the one or more blended images of the wellbore can be generated by applying the image blending technique according to the one or more filtered blending parameters. Further, the one or more blending parameters can be constrained after identifying the one or more blending parameters for the image blending technique to generate one or more constrained blending parameters. In turn, the one or more blended images of the wellbore can be generated by applying the image blending technique according to the one or more constrained blending parameters. Additionally, one or more first blending parameters for either or both a specific depth point associated with the wellbore and a specific button electrode of the electromagnetic imager tool can be identified based on measurements made for either or both the specific depth point and the specific button electrode. Additionally, one or more second blending parameters for either or both an adjacent depth point to the specific depth point associated with the wellbore and another specific button electrode of the electromagnetic imager tool can be identified based on application of the blending parameter machine learning model to the one or more first blending parameters for either or both the specific depth point and the specific button electrode.

What is claimed is:

1. A method comprising:
    training, through a supervised machine learning technique with a dataset of known input and known output associated with an electromagnetic imager tool, a blending parameter machine learning model associated with an image blending technique for blending images generated through the electromagnetic imager tool at different frequencies;
    identifying one or more blending parameters for the image blending technique by applying the blending parameter machine learning model to measurements made by the electromagnetic imager tool operating to log a wellbore across a plurality of frequencies; and
    generating one or more blended images of the wellbore by applying the image blending technique according to the one or more blending parameters to a plurality of images of the measurements made by the electromagnetic imager tool.

2. The method of claim 1, wherein the dataset of known input and known output includes data related to manual application of the image blending technique to images of previous measurements gathered by the electromagnetic imager tool during previous operation of the electromagnetic imager tool.

3. The method of claim 1, wherein the dataset of known input and known output includes data obtained through one or more simulations of operation of the electromagnetic imager tool.

4. The method of claim 1, wherein the known input in the dataset of known input and known output includes one or a combination of apparent impedivity measurements, apparent impedance measurements, stand-off corrected measurements, and dielectric corrected measurements.

5. The method of claim 1, wherein the known input in the dataset of known input and known output includes one or a combination of frequency measurements, caliper measurements, formation resistivity measurements gathered by supplemental tools to the electromagnetic imager tool, and noise level measurements.

6. The method of claim 1, wherein the known output in the dataset of known input and known output includes one or a combination of blending weights corresponding to the known input, blending thresholds corresponding to the known input, and scaling coefficients corresponding to the known input.

7. The method of claim 1, further comprising identifying a plurality of different types of blending parameters by applying the blending parameter machine learning model to the measurements made by the electromagnetic imager tool, and the blending parameter machine learning model is configured to jointly identify all of the plurality of different types of blending parameters together based on the measurements made by the electromagnetic imager tool.

8. The method of claim 1, wherein the blending parameter machine learning model includes a plurality of regression functions and each regression functions produces a corresponding subset of a plurality of different types of blending parameters the method further comprising identifying the plurality of different types of blending parameters by applying the plurality of regression functions to the measurements made by the electromagnetic imager tool.

9. The method of claim 1, further comprising:
calibrating the measurements made by the electromagnetic imager tool operating to log the wellbore to generate calibrated measurements; and
identifying the one or more blending parameters for the image blending technique by applying the blending parameter machine learning model to the calibrated measurements.

10. The method of claim 1, further comprising filtering the measurements made by the electromagnetic imager tool before identifying the one or more blending parameters for the image blending technique.

11. The method of claim 1, further comprising:
filtering the one or more blending parameters after identifying the one or more blending parameters for the image blending technique to generate one or more filtered blending parameters; and
generating the one or more blended images of the wellbore by applying the image blending technique according to the one or more filtered blending parameters.

12. The method of claim 1, further comprising:
constraining the one or more blending parameters after identifying the one or more blending parameters for the image blending technique to generate one or more constrained blending parameters; and
generating the one or more blended images of the wellbore by applying the image blending technique according to the one or more constrained blending parameters.

13. The method of claim 1, wherein the supervised machine learning technique is at least one of an artificial neural network technique, an evolutionary technique, a random forest regression technique, and a support vector machine technique.

14. The method of claim 1, further comprising:
disposing the electromagnetic imager tool in the wellbore; and
operating the electromagnetic imager tool in the wellbore to gather the measurements by logging the wellbore across the plurality of frequencies.

15. The method of claim 1, further comprising:
identifying one or more first blending parameters for either or both a specific depth point associated with the wellbore and a specific button electrode of the electromagnetic imager tool based on measurements made for either or both the specific depth point and the specific button electrode; and
identifying one or more second blending parameters for either or both an adjacent depth point to the specific depth point associated with the wellbore and another specific button electrode of the electromagnetic imager tool based on application of the blending parameter machine learning model to the one or more first blending parameters for either or both the specific depth point and the specific button electrode.

16. The method of claim 8, further comprising switching application of the plurality of regression functions to the measurements through a decision tree to identify the plurality of different types of blending parameters.

17. The method of claim 14, further comprising applying the measurements gathered by the electromagnetic imager tool as input to the blending parameter machine learning model to identify the one or more blending parameters.

18. A system comprising:
one or more processors; and
at least one computer-readable storage medium having stored therein instructions which, when executed by the one or more processors, cause the one or more processors to perform operations comprising:
training, through a supervised machine learning technique with a dataset of known input and known output associated with an electromagnetic imager tool, a blending parameter machine learning model associated with an image blending technique for blending images generated through the electromagnetic imager tool at different frequencies;
identifying one or more blending parameters for the image blending technique by applying the blending parameter machine learning model to measurements made by the electromagnetic imager tool operating to log a wellbore across a plurality of frequencies; and
generating one or more blended images of the wellbore by applying the image blending technique according to the one or more blending parameters to a plurality of images of the measurements made by the electromagnetic imager tool.

19. The system of claim 18, further comprising the electromagnetic imager tool configured to gather the measurements by logging the wellbore across the plurality of frequencies when the electromagnetic imager tool is disposed in the wellbore.

20. A non-transitory computer-readable storage medium having stored therein instructions which, when executed by one or more processors, cause the one or more processors to perform operations comprising:
training, through a supervised machine learning technique with a dataset of known input and known output associated with an electromagnetic imager tool, a blending parameter machine learning model associated with an image blending technique for blending images generated through the electromagnetic imager tool at different frequencies;
identifying one or more blending parameters for the image blending technique by applying the blending parameter machine learning model to measurements made by the electromagnetic imager tool operating to log a wellbore across a plurality of frequencies; and
generating one or more blended images of the wellbore by applying the image blending technique according to the one or more blending parameters to a plurality of images of the measurements made by the electromagnetic imager tool.

* * * * *